United States Patent
Bennett et al.

(10) Patent No.: US 10,169,002 B2
(45) Date of Patent: *Jan. 1, 2019

(54) AUTOMATED AND HEURISTICALLY MANAGED SOLUTION TO QUANTIFY CPU AND PATH LENGTH COST OF INSTRUCTIONS ADDED, CHANGED OR REMOVED BY A SERVICE TEAM

(71) Applicant: International Business Machines Corporation, Armonk, NY (US)

(72) Inventors: Nicola J. Bennett, Winchester (GB); David J. Harman, Eastleigh (GB); David E. Knibb, Hull (GB); Felicity J. Merrison, Romsey (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/379,031

(22) Filed: Dec. 14, 2016

(65) Prior Publication Data

US 2017/0097812 A1    Apr. 6, 2017

Related U.S. Application Data

(63) Continuation of application No. 13/314,675, filed on Dec. 8, 2011, now Pat. No. 9,552,202.

(51) Int. Cl.
*G06F 9/44* (2018.01)
*G06F 8/33* (2018.01)
(Continued)

(52) U.S. Cl.
CPC .................. *G06F 8/33* (2013.01); *G06F 8/70* (2013.01); *G06F 17/30424* (2013.01)

(58) Field of Classification Search
CPC ......... G06F 8/33; G06F 8/70; G06F 17/30424
(Continued)

(56) References Cited

U.S. PATENT DOCUMENTS 7,093,234 B2  8/2006  Hibbeler et al.
7,315,795 B2  1/2008  Homma
(Continued)

OTHER PUBLICATIONS

Cost Estimation and Evolvability Monitoring for Software Evolution Processes WESS 2000 Workshop on Empirical Studies of Software Maintenance, Oct. 14, 2000, San Jose, CA.
(Continued)

*Primary Examiner* — Anna C Deng
(74) *Attorney, Agent, or Firm* — Steven M. Greenberg, Esq.; Shutts & Bowen LLP

(57) ABSTRACT

Embodiments of the present invention provide a method, system, and computer program product for qualifying changes to an instruction set in source code. In an embodiment of the invention, a method for quantifying changes to an instruction set in source code can be provided. The method can include receiving text in a code editor as an edit to source code of a computer program querying a data store of code change costs with at least a portion of the edit. The method additionally can include retrieving in response to the query a code change cost associated with the edit. Finally, the method can include displaying in the code editor the retrieved code change cost.

20 Claims, 3 Drawing Sheets

(51) Int. Cl.
*G06F 8/70* (2018.01)
*G06F 17/30* (2006.01)

(58) Field of Classification Search
USPC .......................................................... 717/111
See application file for complete search history.

(56) References Cited

U.S. PATENT DOCUMENTS

| | | | |
|---|---|---|---|
| 7,689,517 B2 | 3/2010 | Andreev et al. | |
| 8,219,983 B1* | 7/2012 | Sobel | G06F 8/60 717/126 |
| 8,468,516 B1* | 6/2013 | Chen | G06F 8/67 707/687 |
| 8,655,623 B2* | 2/2014 | Duyanovich | G06F 11/0709 702/182 |
| 2005/0114828 A1 | 5/2005 | Dietrich, Jr. et al. | |
| 2006/0041864 A1 | 2/2006 | Holloway et al. | |
| 2008/0172660 A1* | 7/2008 | Arning | G06F 8/33 717/144 |
| 2008/0306711 A1* | 12/2008 | Bansal | G06F 11/3419 702/182 |
| 2009/0125891 A1* | 5/2009 | Garimella | G06F 11/3612 717/131 |
| 2009/0138860 A1 | 5/2009 | Fusegawa et al. | |
| 2009/0217247 A1 | 8/2009 | Kamigata et al. | |
| 2011/0137891 A1 | 6/2011 | Brodsky et al. | |
| 2012/0054731 A1* | 3/2012 | Aravamudan | G06F 8/63 717/170 |
| 2012/0060142 A1* | 3/2012 | Fliess | G06F 8/70 717/102 |
| 2012/0089964 A1 | 4/2012 | Sawano | |
| 2012/0297362 A1 | 11/2012 | Arning et al. | |

OTHER PUBLICATIONS

Software Maintenance Cost Estimation and Modernization Support ELTIS-project, Aug. 15, 2003.
Lum, et al., Handbook for Software Cost Estimation, May 30, 2003.
Arun Mukhija, Estimating Software Maintenance, Seminar on Software Cost Estimation, Jan. 21, 2003.

* cited by examiner

AUTOMATED AND HEURISTICALLY MANAGED SOLUTION TO QUANTIFY CPU AND PATH LENGTH COST OF INSTRUCTIONS ADDED, CHANGED OR REMOVED BY A SERVICE TEAM

This application is a continuation of and claims priority to U.S. patent application Ser. No. 13/314,675, filed Dec. 8, 2011, the disclosure of which is hereby incorporated by reference.

BACKGROUND OF THE INVENTION

Field of the Invention

The present invention relates to program code development and more particularly to capturing performance data for newly developed or changed code.

Description of the Related Art

Software testing is an investigation conducted to determine the quality of a software product or service under test. Software testing can be performed by the programmer or team of programmers who had developed the software program code of the software product in the first instance, or for more organized efforts, by a group of dedicated software testers or quality assurance testers. The testers typically use different types of testing methods, including white box testing, black box testing, and gray box testing. White box testing refers to when a tester has access to the internal data structures and algorithms including the computer code that implements the structures and algorithms; black box testing treats the software as a "black box"—without any knowledge of internal implementation; and, gray box testing involves the tester having knowledge of internal data structures and algorithms for the purpose of designing test cases, but testing at the user, or black-box level.

During the development phase for a new release of an application under test, part of the testing of a new code base of the application under test involves capturing performance data, such as central processing unit (CPU) usage resulting from the application under test. Performance measurement usually involves running sets of well-defined test cases against the application under test and using system tooling to measure concomitant changes to the system performance resulting from the execution of the application under test when compared to earlier releases of the application under test. In addition, software monitoring products can generate additional data from the execution of the application under test, which can provide a coarse level of CPU-usage at the region level and at an individual transaction level.

But, a tester using software monitoring tools to test an application under test still must use a "post-processing tool" to analyze and breakdown performance data collected during testing. In addition, a tester still must run specific benchmark comparisons on different computing systems to compare and then contrast CPU costs for code paths used for specific workloads in testing an application under test. Oftentimes, this level of in-depth performance analysis and testing is not available to support and service software developers deploying changes to an application under test. Thus, software developers often must apply small alterations to existing programs and work to schedules that preclude complete performance reevaluations of an application under test after each of the changes have been applied to the application under test. With no analysis and testing tools available, performance metrics thus are only based upon the experience and best judgment of the software developer.

BRIEF SUMMARY OF THE INVENTION

Embodiments of the present invention address deficiencies of the art in respect to reporting on performance effects of changes made to source code during the maintenance of software and provide a novel and non-obvious method, system, and computer program product for qualifying changes to an instruction set in source code. In an embodiment of the invention, a method for qualifying changes to an instruction set in source code can be provided. The method can include receiving text in a code editor as an edit to source code of a computer program querying a data store of code change costs with at least a portion of the edit. The method additionally can include retrieving in response to the query a code change cost associated with the edit. Finally, the method can include displaying in the code editor the retrieved code change cost.

In one aspect of the embodiment, the code editor is part of an integrated development environment (IDE). In another aspect of the embodiment, the edit can be an added instruction in a Customer Information Control System (CICS) transaction server environment. In yet another aspect of the embodiment, the code change cost can be a value corresponding to either or any combination of a change in central processing unit (CPU) usage, a change in code execution path length or response time. In even yet another aspect of the embodiment, performance data resulting from an execution of instructions can be monitored and the data store of code changes can be updated with performance data resulting from the execution of the instructions including at least one of CPU usage, path length and response time.

In another embodiment of the invention, a change quantification system has been provided. The system can include a server computer configured for communicative coupling to a client computer over a computer communications network and a data store of code change costs coupled to the server. The system additionally can include a code editor executing in memory of the server computer and an instruction set cost server module coupled to the code editor. The module can include program code enabled when executing in the memory of the server to receive an instruction set query from the client, to respond to a text edit of code instructions in the code editor by querying the data store of code change costs with at least a portion of the text edit, by retrieving in response to the query a code change cost associated with the text edit and by displaying in the code editor the retrieved code change cost.

Another embodiment of the invention provides for a change qualification system. The system can include a server coupled to a historical database configured to support an instruction set cost server module. The server can be networked to a client configured to support a display, an application, and an instruction set cost client module. The instruction set cost server module can include program code for receiving an instruction set query from the client, determining cost information for the instruction set, and sending cost information to the client. The instruction set cost client module can include program code for querying a historical database for instruction set cost information, receiving cost information, displaying cost information, and submitting committed instruction set code changes.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for predicting performance consequences for a change in code instructions within source code of a computer program. In accordance with an embodiment of the invention, proposed changes to source code applied by way of an edit to the source code can be monitored. Upon detecting edit to the source code, specifically an addition, change or deletion of a specific code instruction within the source code, an end user, for instance a computer program developer, can receive predicted consequential information, namely code change cost values predicted for the edit. The code change cost values can include, by way of example, an expected change in CPU consumption, a change in overall instruction path length, and an expected change in wall clock elapsed time when executing the portion of code affected by the proposed edit. In this way, the impact of the edit can be visualized by the end user without requiring the end user to separately execute resource and time consumptive benchmark comparison tests.

Figure 1:
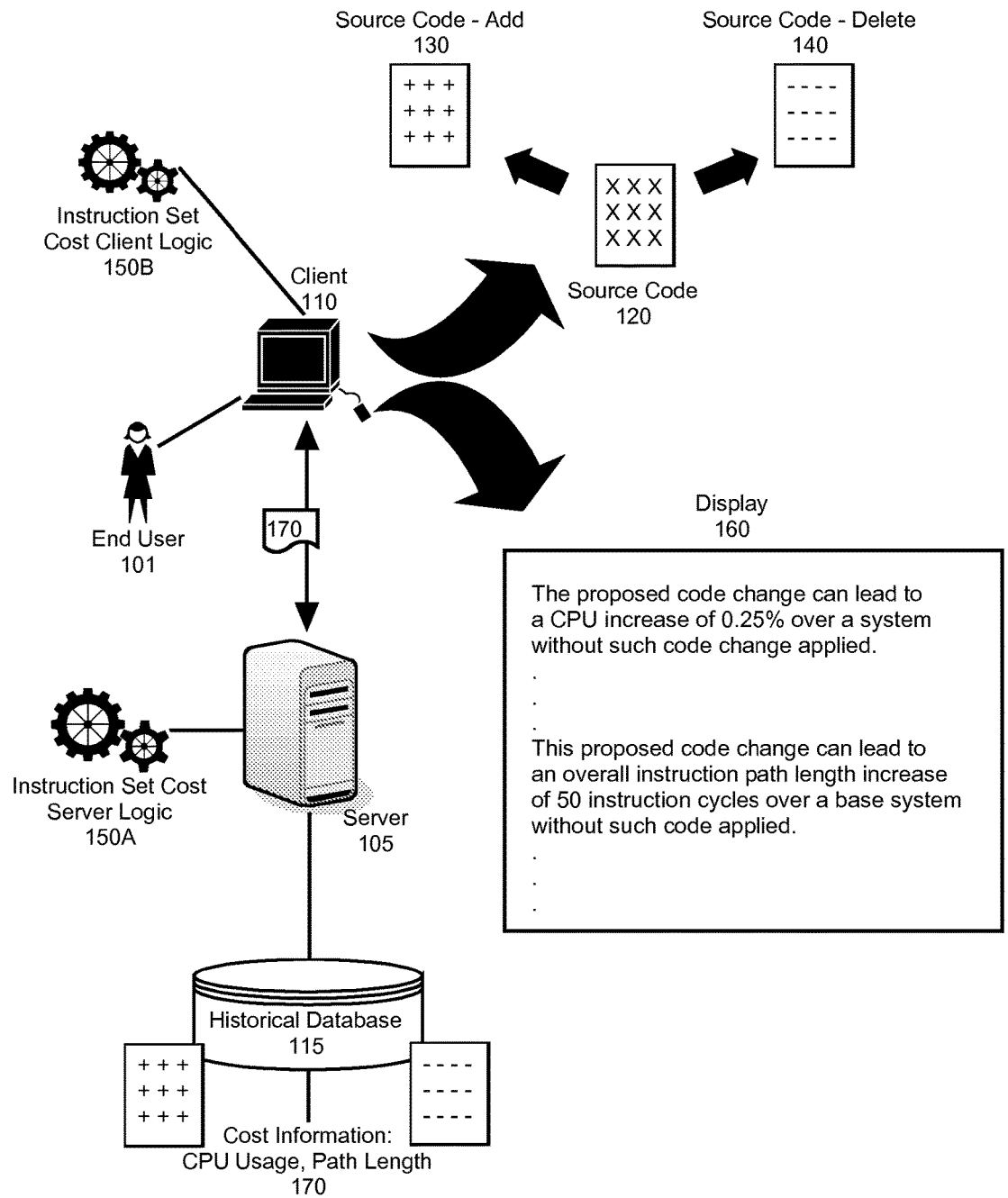
FIG. 1 is a pictorial illustration of a process for qualifying changes to an instruction set in source code.

In further illustration, FIG. 1 pictorially shows a process for qualifying changes to an instruction set in source code. As shown in FIG. 1, an end user 101, such as a change team programmer, works on a client 110 by modifying particular instructions within source code 120, for instance adding instructions to source code 130 or deleting instructions from source code 140. Upon modifying the source code 120, instruction set cost client logic 150B can send an instruction set query to a server 105. Upon receiving the instruction set query from the client 110, instruction set cost server logic 150A on the server 105 can determine cost information 170 for the instruction set that was modified. Cost information 170 can include but not be limited to CPU cost, path length changes, and wall clock elapsed time.

Upon determining cost information 170, instruction set cost server logic 150A can send the calculated cost information 170 to the client 110. Instruction set cost client logic 150B can display 160 the results on the client 110 to an end user 101. For instance, implementing a code change for a specific instruction set could lead to a display 160 that reported:

"This proposed code change can lead to a CPU increase of 0.25% over a system without such a code change applied. Use of the X instruction per se can lead to a CPU increase of 0.15% over a system without such code applied. Use of the remaining instructions can lead to a CPU increase of 0.1% over a system without such code applied. This proposed code change can lead to an overall instruction path length increase of 50 instruction cycles over a base system without such code applied. This proposed code change can lead to an overall instruction path length increase of 34 instruction systems over a best so far system without such code applied."

Of note, "X" represents use of a specific instruction set or combination of instruction sets. Of further note, the cost information 170 can also be hard coded within an application, such as an editor, compiler, or integrated development environment (IDE). In addition, the cost information 170 can also be provided to an end user 101 during product development. Cost information 170 can also be updated as service ship changes to the product the end user 101 is supporting, so up-to-date information for "best so far" programs, with all service fixes applied to them, can be known as well.

A historical database 115 can also be coupled to the server 105. The historical database can record the cost information 170, including CPU costs and path length increases, for different sets of instructions in order to create a historical record of changes made to the source code. A client 110 via instruction set cost client logic 150B can query the historical database 115 coupled to the server 105 and retrieve cost information 170 that can then be displayed 160 to the end user 101 on the client 110. Of note, the historical database can be updated by the client 110 through instruction set cost client logic 150B as changes to the source code base are committed. In this way, the historical database 115 can grow to provide an accurate historical record of the costs 170 of using specific instructions for a given program. Instruction set cost server logic 150A can use the data in the historical database 115 to learn from changes in the past and heuristically reflect these changes in its recommendation to the end user 101 when source code 120 is to be altered in the future. In addition, instruction set cost server logic 150A can share cost information 170 with other programs; in this way, the historical knowledge built up for one particular instruction set can be made available to other programs within a product an end user 101 might want to modify in the future.

Figure 2:
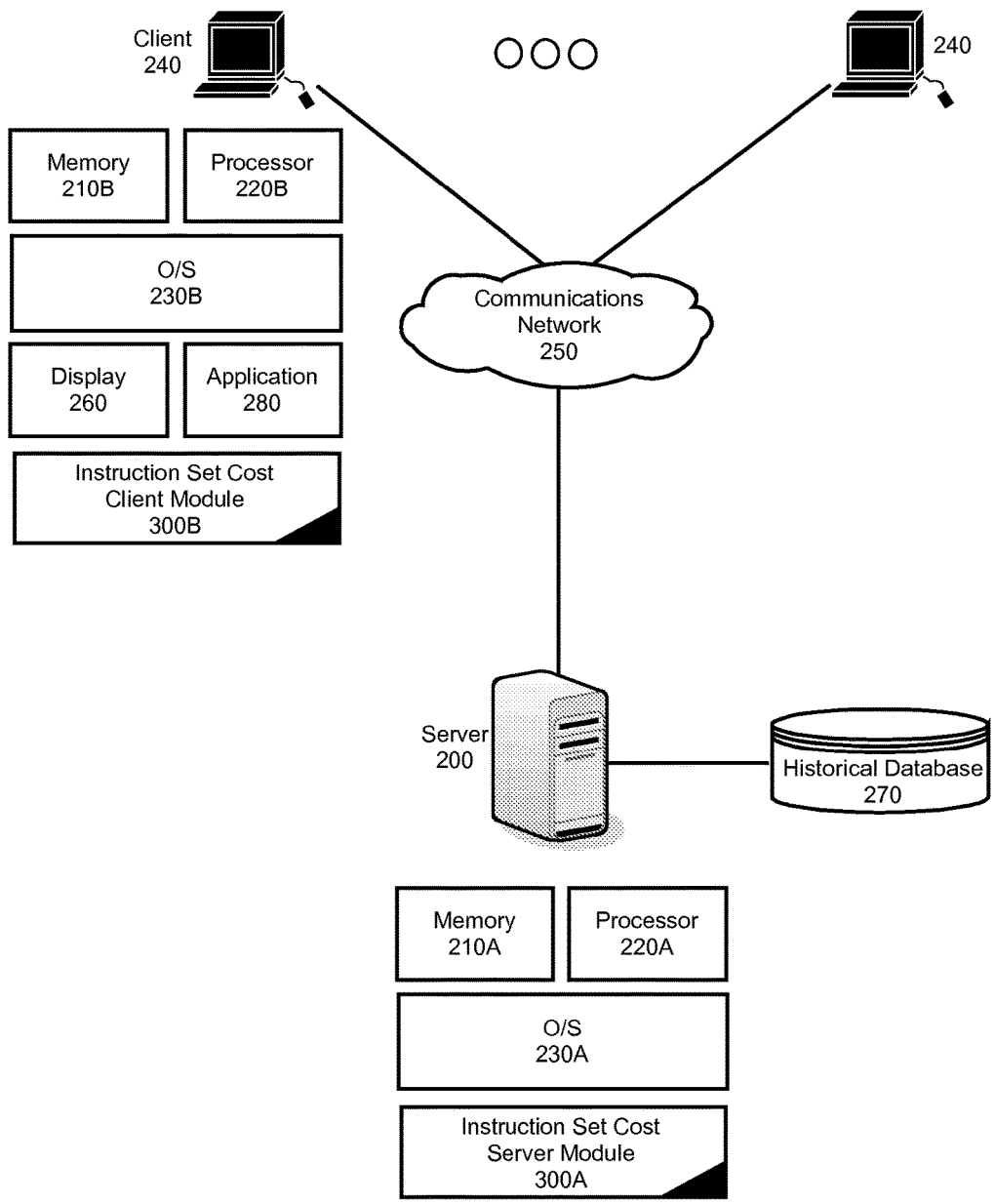
FIG. 2 is a schematic illustration of a change quantification system configured to quantify changes to an instruction set in source code; and, FIG. 3 is a flow chart illustrating a process for qualifying changes to an instruction set in source code.

The process described in connection with FIG. 1 can be implemented in a change quantification system. In further illustration, FIG. 2 shows a schematic illustration of a change quantification system configured to quantify changes to an instruction set in source code. The system can include a server 200. The server 200 can include at least one processor 220A, memory 210A, and an operating system (O/S) 230A supporting the execution of an instruction set cost server module 300A. The instruction set cost server module 300A can communicate over a communications network 250 with an instruction set cost client module 300B on a client 240. The communications network 250 is not limited to a specific type of network, but can include Ethernet, Internet, wireless communications, 4G, and 3G.

Each client 240 can include one processor 220B, memory 210B, and an O/S 230B. The O/S 230B can support the operation of a display 260 executing an application 280. The application 280 can include programmer tools, including but not limited to a compiler, an IDE, an editor as well as any other application that allows an end user, such as a programmer to modify, for instance, adding, changing, or deleting source code or instruction sets for source code. For simplicity, the presence of a processor 220B, memory 210B, O/S 230B, display 260, application 280, and instruction set cost client module 300B is only shown once, but can exist on each client 240.

The instruction set cost server module 300A can include program code, which when executed by at least one processor 220A on the server 200 responds to receiving an instruction query set query from a client 240. Upon receiving the instruction set, cost information for the instruction set can be determined. Cost information can include capturing CPU usage, instruction path length, machine cycles, and response time for specific changes to instruction sets within source code. In one instance, a trace can be used to capture cost information. Upon determining the cost information for the instruction set, the cost information can be sent to the client 240. In another instance, cost information can be captured by utilizing run-time execution data captured by performance metrics gathered when executing system software. In this way, existing benchmark path lengths and CPU costs involved in executing the functionality with the code can be captured. This information can then be used to quantify information related to projected cost of changes to code.

The instruction set cost server module 300A can further include program code to maintain a historical database 270 coupled to the server 200. The historical database 270 can store cost information, such as CPU usage and path length, for different sets of instructions. The program code can further be enabled to update the historical database 270 upon an end user committing changes to source code for an instruction set. In this way, the historical database 270 can grow to provide a historical record of the costs in using specific instructions for a given program. Instruction set cost server module 300A can even further be enabled to provide a recommendation to an end user via a client 240 based upon the historical record of the cost of using an instruction set.

Of note, the program code of the instruction set cost server module 300A can further be enabled to provide information on the likely effects of CPU increase or path length change or other cost information upon any iterative features of the source code. For instance, if the new code is part of a loop, then ranges for iterating a loop code can be used to report on the likely impact on CPU usage and path length. The program code can also be further enabled to report cost information based upon different classes of hardware. The program code can yet be further enabled to provide context-relevant information about the likely cost of modifying instructions within particular parts of source code.

For instance, changes to mainline source code paths would be executed far more often than changes made to recovery routines or error handling paths. Instruction set cost server module 300A can also be used to determine cost information for more general changes to code, such as inserting instructions to call a subroutine or environmental operations, including changing the source code to enable another subsystem as opposed to specific instructions. The module 300A can determine the likely effect based upon existing data from other parts of the source code that perform similar operations, since the code most likely calls macros, functions, and involves more complex code path, so just using performance metrics is not an option.

The instruction set cost client module 300B can include program code, which when executed by at least one processor 220B on the client 240 can query a historical database 270 coupled to a server 200 via the instruction set cost server module 300A for cost information for an instruction set. Of note, in one instance, the client module 300B can be incorporated into programmer tools, including but not limited to a compiler and IDE. Upon receiving the cost information, the instruction set cost client module 300B can display the cost information on a display 260 supported by the O/S 230B of the client 200. The client module 300B can further be enabled to submit committed changes. In this way, the historical database 270 can be updated to provide an accurate record of the cost of using specific instructions for a given program.

Figure 3:
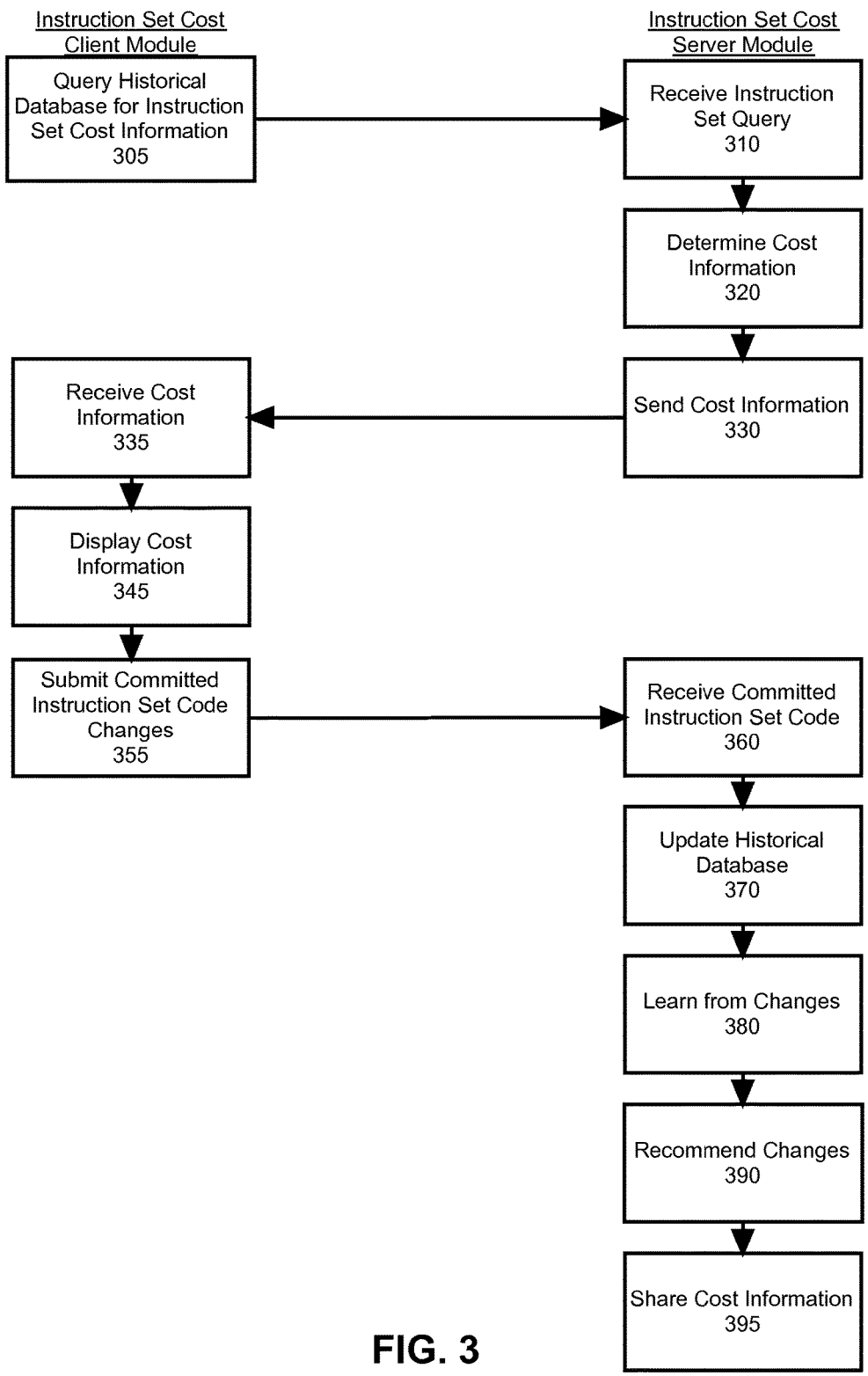

In even yet further illustration of the operating of the program code of the instruction set cost client module 300B and the instruction set cost server module 300A, FIG. 3 is a flow chart illustrating a process for qualifying changes to an instruction set in source code. In step 305, an instruction set cost client module can query a historical database for cost information for an instruction set. In step 310, an instruction set cost server module can receive the instruction set query and can then determine cost information for the instruction set, as shown in step 320. In one instance, cost information, including CPU costs, such as CPU usage, path length changes, such as increases, and response time, can be captured by utilizing run-time execution data from performance metrics. In other instance, a trace can be used. The server module can then send cost information to the client module, as indicated in step 330.

Upon receiving the cost information, as in step 335, the client module can display the cost information to an end user, as in step 345. In step 355, the client module can submit committed instruction set code changes. In step 360, upon receiving the committed instruction set code, the server module, can update an historical database, as shown in step 370. In this way, the historical database can grow to provide an accurate historical record of the cost in using specific instructions for a given program. In step 380, the server module can learn from changes (to an instruction set) in the past and reflect theses changes in recommendations for code changes the server module makes in the future, as shown in step 390. In this way, based on the recommended code changes, the server module can also provide cost information to the client, which can guide an end user on the likely effect of changing their code based upon prior experience of specific program changes. In step 395, the server module can share cost information, if so desired, between program environments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for qualifying changes to an instruction set in source code of a computer program, the method comprising:
receiving text in a code editor as an edit to the source code of the computer program; and,
responding to the edit to the source code before the edit to the source code is committed for use in the computer program by:
determining a portion of the source code that was modified as the edit to the source code including the instruction set;
querying a data store of code change costs for instruction set cost information, wherein the instruction set cost information comprises performance data from execution of the instruction set, the performance data associated with at least one of central processing unit (CPU) usage, path length, and response time;
determining a code change cost as edit to the source code including the instruction set based on instruction set cost information;
retrieving the determined code change cost as the edit to the source code including the instruction set;
displaying in the code editor the retrieved code change cost; and
subsequent to the displaying, committing the edit to the source code for use in the computer program.

2. The method of claim 1, wherein the code editor is part of an integrated development environment (IDE).

3. The method of claim 1, wherein the edit is an added instruction in a Customer Information Control System (CICS) transaction server environment.

4. The method of claim 1, wherein the code change cost is a value corresponding to a change in central processing unit (CPU) usage.

5. The method of claim 1, wherein the code change cost is a value corresponding to a change in path length.

6. The method of claim 1, wherein the code change cost is a value corresponding to response time.

7. The method of claim 1, further comprising:
monitoring performance data resulting from an execution of instructions; and,
updating the data store of code changes with performance data resulting from the execution of the instructions including at least one of central processing unit (CPU) usage, path length and response time.

8. A system for qualifying changes to an instruction set in source code of a computer program, the system comprising:
a server computer configured for communicative coupling to a client computer over a computer communications network;
a data store of code change costs coupled to the server;
a code editor executing in memory of the server computer; and
an instruction set cost server module coupled to the code editor, the module comprising program code enabled when executing in memory of the server to receive text in a code editor as an edit to the source code of the computer program, and to respond to the edit to the source code before the edit to the source code is committed for use in the computer program by:
determining a portion of the source code that was modified as the edit to the source code including the instruction set;
querying a data store of code change costs for instruction set cost information, wherein the instruction set cost information comprises performance data from execution of the instruction set, the performance data associated with at least one of central processing unit (CPU) usage, path length, and response time;
determining a code change cost as edit to the source code including the instruction set based on instruction set cost information;
retrieving the determined code change cost as the edit to the source code including the instruction set;
displaying in the code editor the retrieved code change cost; and
subsequent to the displaying, committing the edit to the source code for use in the computer program.

9. The system of claim 8, wherein the code editor is part of an integrated development environment (IDE).

10. The system of claim 8, wherein the edit is an added instruction in a Customer Information Control System (CICS) transaction server environment.

11. The system of claim 8, wherein the code change cost is a value corresponding to a change in central processing unit (CPU) usage.

12. The system of claim 8, wherein the code change cost is a value corresponding to a change in path length.

13. The system of claim 8, wherein the code change cost is a value corresponding to response time.

14. A computer program product for qualifying changes to an instruction set in source code of a computer program, the computer program product comprising:
a computer readable storage medium having computer readable program code embodied therewith, the computer readable program code comprising:
computer readable program code for receiving text in a code editor as an edit to the source code of the computer program querying a data store of code change costs with at least a portion of the edit; and,
computer readable program code for responding to the edit to the source code before the edit to the source code is committed for use in the computer program by:
determining a portion of the source code that was modified as the edit to the source code including the instruction set;
querying a data store of code change costs for instruction set cost information, wherein the instruction set cost information comprises performance data from execution of the instruction set, the performance data associated with at least one of central processing unit (CPU) usage, path length, and response time;
determining a code change cost as edit to the source code including the instruction set based on instruction set cost information;
retrieving the determined code change cost as the edit to the source code including the instruction set;
displaying in the code editor the retrieved code change cost; and
subsequent to the displaying, committing the edit to the source code for use in the computer program.

15. The computer program product of claim 14, wherein the code editor is part of an integrated development environment (IDE).

16. The computer program product of claim 14, wherein the edit is an added instruction in a Customer Information Control System (CICS) transaction server environment.

17. The computer program product of claim 14, wherein the code change cost is a value corresponding to a change in central processing unit (CPU) usage.

18. The computer program product of claim 14, wherein the code change cost is a value corresponding to a change in path length.

19. The computer program product of claim 14, wherein the code change cost is a value corresponding to response time.

20. The computer program product of claim 14, further comprising:
   computer readable program code for monitoring performance data resulting from an execution of instructions; and,
   computer readable program code for updating the data store of code changes with performance data resulting from the execution of the instructions including at least one of central processing unit (CPU) usage, path length and response time.

\* \* \* \* \*